US009644720B2

(12) United States Patent
Robertson et al.

(10) Patent No.: US 9,644,720 B2
(45) Date of Patent: May 9, 2017

(54) ORIENTATION INDEPENDENT FOCUS MECHANISMS FOR LASER RADAR

(71) Applicants: Lorri L. Watson, Campbell, CA (US); Nikon Corporation, Tokyo (JP)

(72) Inventors: Alec Robertson, Palo Alto, CA (US); Douglas C. Watson, Campbell, CA (US); Alexander Cooper, Belmont, CA (US)

(73) Assignee: Nikon Corporation, Tokyo (JP)

( * ) Notice: Subject to any disclaimer, the term of this patent is extended or adjusted under 35 U.S.C. 154(b) by 982 days.

(21) Appl. No.: 13/833,726

(22) Filed: Mar. 15, 2013

(65) Prior Publication Data

US 2014/0152972 A1    Jun. 5, 2014

Related U.S. Application Data

(60) Provisional application No. 61/695,963, filed on Aug. 31, 2012.

(51) Int. Cl.
| | |
|---|---|
| *G01C 3/08* | (2006.01) |
| *F16H 35/06* | (2006.01) |
| *G01S 7/481* | (2006.01) |
| *G01S 7/497* | (2006.01) |
| *G02B 7/08* | (2006.01) |
| *G02B 7/18* | (2006.01) |

(52) U.S. Cl.
CPC ............ *F16H 35/06* (2013.01); *G01S 7/4813* (2013.01); *G01S 7/4818* (2013.01); *G01S 7/4972* (2013.01); *G02B 7/08* (2013.01); *G02B 7/1805* (2013.01); *Y10T 29/49* (2015.01); *Y10T 74/18888* (2015.01)

(58) Field of Classification Search
CPC ...... F16H 35/06; G01S 7/4813; G01S 7/4818; G01S 7/4972; G02B 7/08; G02B 7/1805; Y10T 74/18888; Y10T 29/49
See application file for complete search history.

(56) References Cited

U.S. PATENT DOCUMENTS

| | | | |
|---|---|---|---|
| 6,891,601 B2 * | 5/2005 | Jeanne | G03B 27/58 310/12.01 |
| 7,087,906 B2 | 8/2006 | Hazelton | |
| 2002/0144987 A1 * | 10/2002 | Tomlinson | B23K 26/02 219/121.74 |
| 2010/0096935 A1 * | 4/2010 | Hennessey | G03F 7/70716 310/12.06 |
| 2011/0109946 A1 * | 5/2011 | Osipchuk | F16F 7/104 358/474 |

* cited by examiner

*Primary Examiner* — Samantha K Abraham
(74) *Attorney, Agent, or Firm* — Klarquist Sparkman, LLP (57) ABSTRACT

Focus arrangements for laser radar and other applications provide compensation of orientation-dependent gravitational forces. A linear stage can be preloaded and provided with balanced linear encoders so that gravitational force induced pitch, yaw, and roll can be reduced, detected, or compensated. Alternatively, movable focus elements can be secured to actuator driven spring assemblies that are controlled to compensate orientation-dependent gravitational forces.

15 Claims, 9 Drawing Sheets

256# ORIENTATION INDEPENDENT FOCUS MECHANISMS FOR LASER RADAR

CROSS REFERENCE TO RELATED APPLICATION

This application claims the benefit of U.S. Provisional Application 61/695,963, filed Aug. 31, 2012, which is incorporated herein by reference.

FIELD

The disclosure pertains to focus mechanisms for laser radar.

BACKGROUND

Laser radar systems require precise focus mechanisms in order to provide the measurement accuracy demanded in many manufacturing applications. In one laser radar system, a probe laser beam is focused on a target by translation of a corner cube. While a corner cube tends to reduce errors associated with various tips and tilts, conventional translation mechanisms often lack the desired accuracy and stability because the focus stage is large and is situated a significant distance from beam-forming optical components such as focusing lenses. Linear guides can be used, but alignment is difficult and stability over a wide temperature range can be problematic.

SUMMARY

Focus stages comprise a linear stage that includes a carriage and a guide. A motor is configured to translate the carriage along an axis defined by the guide. First and second linear encoders are oppositely situated along the axis and provide an indication of carriage position based on a combination of encoder signals from the first and second linear encoders. In some examples, the motor is a piezoelectric motor and a focus adjustment optical element is secured to the carriage. According to some examples, the focus adjustment optical element is secured to the carriage so as to have a nodal point equidistant from the first and second linear encoders. In a specific embodiment, the focus adjustment optical element is configured to adjust a focus of a beam on a target in a laser radar and is a corner cube or roof prism. In other examples, a retro-reflector is secured to the carriage so that a nodal point is equidistant from the first and second linear encoders. In other examples, the first and second linear encoders include respective read heads and linear scales situated in line with the nodal point.

Methods comprise supporting a movable element such that a force associated with translating the movable element is substantially independent of movable element orientation with respect to gravity. In some examples, the force associated with translating the movable element is based on an actuator-spring combination configured to compensate an orientation-dependent gravitational force.

Apparatus comprise an optical element secured to a first actuator, and an elastic member secured to a second actuator. At least one of the optical element and the first actuator are coupled to the elastic member, and at least one of the first actuator and the second actuator are configured so that a force on the optical element associated with the elastic member is equal and opposite to an orientation-dependent gravitational force on the optical element.

Actuator systems comprise a first actuator configured to be secured to an optical system and scan the optical system along an axis from an initial position. An elastic member is coupled to a second actuator, wherein the second actuator is configured to apply a force with the elastic member to compensate an orientation-dependent gravitational force on the optical system. In typical examples, the applied force is selected so as to return the optical system to the initial location, and the elastic member is a spring. In other examples, the initial location is associated with an optical system location without a displacement due to optical system weight. In some examples, a position sensor is configured to determine a position of the optical system, wherein the second actuator is configured to apply a force based on the determined position. According to some examples, the position sensor includes one or more linear encoders. In further examples, an inclinometer is configured to establish a tilt of the scan axis with respect to a vertical axis, and the second actuator is configured to apply a force with the elastic member based on the determined tilt.

Focus systems comprise a linear stage that includes a carriage and a guide, and a motor configured to translate the carriage along an axis defined by the guide. First and second linear encoders are oppositely situated along the axis and configured to provide an indication of carriage position. An actuator and an elastic member are coupled to a focus adjustment optical element so as to compensate orientation-dependent forces. In some examples, the actuator is configured to apply a force to the focus adjustment optical element so as to compensate an orientation-dependent gravitational force. In other examples, the actuator is coupled to apply a compensating force to the focus adjustment optical element based on a position of the focus adjustment optical element reported by one of the first or second linear encoders. According to some examples, the elastic member is a spring and the focus adjustment optical element is a corner cube or a roof prism.

The foregoing and other objects, features, and advantages of the disclosed technology will become more apparent from the following detailed description, which proceeds with reference to the accompanying figures.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Systems and components are described with reference to top, side, and other views that are arbitrarily chosen for illustration, and do not require any particular spatial orientation. However, in some examples, vertical and horizontal orientations are described with reference to gravitational forces as will be apparent.

Some laser radar optical designs require a linear stage to move a corner cube or other optical element to focus a laser beam at a given distance or for other purposes. See, for example, the laser radar system illustrated schematically in FIG. 7. The motion of the focus stage in this example is typically about 0-15 mm, corresponding to a focusing range of 1-60 m. The position of the corner cube along its travel must be repeatable as an error in focus position of X µm results in 4X µm of error in range measurement. For successful operation, a stage design preferably provides repeatable corner cube position, permits operation in multiple orientations to accommodate various orientations of the laser radar that are subject to varying effects of gravity, and operates over a large temperature range.

In some examples discussed below, a compensating actuator is coupled to an optical assembly such as one or more optical elements with an elastic member such as a spring. The optical assembly is generally secured to a dedicated actuator, and in some cases, the compensating actuator can be coupled to the dedicated actuator with the elastic member. In order to compensate gravitational forces encountered for arbitrary orientations, the compensating actuator applies a force based on the mass of the optical system.

EXAMPLE 1

Representative Focus Mechanism

With reference to FIG. 1, a frame 102 is configured to serve as a base for a focus stage 100. In one application, the frame 102 is mounted into an elevation shaft of a laser radar via three bosses and through bolts arranged at an approximately 120 degree angular separation to provide a quasi-kinematic mounting configuration so as to isolate the focus stage 100 from thermal deformations of structures to which it is mounted.

Figure 1A:
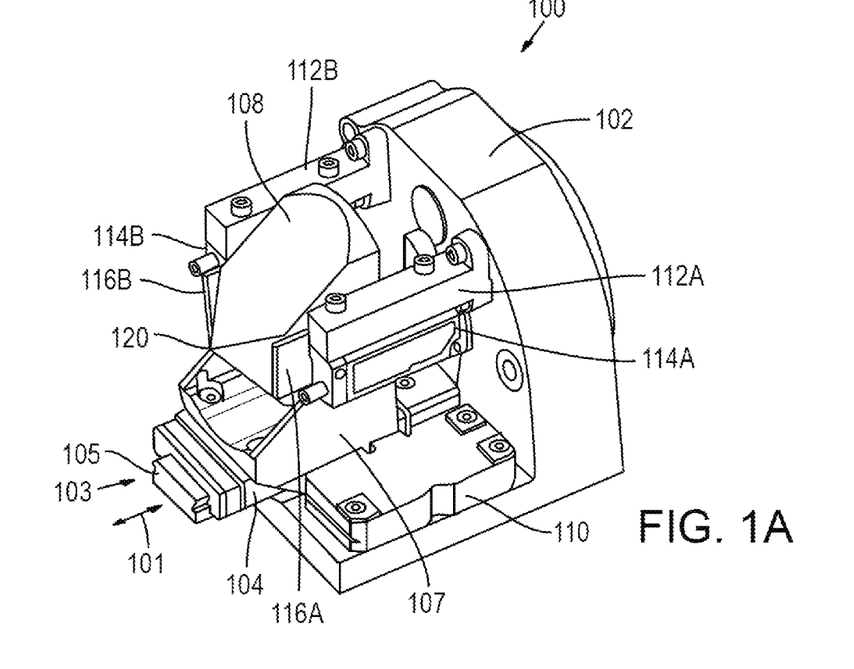
FIGS. 1A-1D illustrate a representative focus mechanism that includes a linear guide with oppositely situated encoders.

A linear axis stage 103 comprises a linear guide having a rail 105 and a carriage 104. A corner cube 108 is secured to a housing 107 that is attached to the carriage 104. In one example, the frame 102 is aluminum and the rail 105 is steel, and the rail 105 is bolted to the frame 102 with two bolts, one of which connects via a flexure mechanism to accommodate a thermal expansion coefficient mismatch between the frame 102 and the rail 105. The corner cube 108 is glass and is mounted to the housing 107 so as to be translatable along an axis 101 defined by the linear guide. In one application, the carriage 104, the corner cube 108, and the housing 107 are movable to provide a focus adjustment.

A piezoelectric motor 110 is situated to move the carriage 104 linearly along the rail 105. While other motors can be used, a piezoelectric motor can provide a static holding force capable of supporting the mass of the moving elements against gravity without requiring power input to the motor. In addition, the piezoelectric motor 110 is coupled to move the carriage 104, the housing 107, and the corner cube 108, with a velocity and acceleration that is consistent with an intended focus adjustment. Other types of motors can be used as well. However, motors such as voice-coil motors may require a current to be applied continuously to support a mass against gravity, even when stationary. Under these conditions, use of an anti-gravity device as described in Example 2 is desirable to prevent excessive heat build-up in the voice-coil motor. Encoder read-head mounts 112A, 112B are situated on opposite sides of the corner cube 108 and the housing 107. Respective encoder read heads 114A, 114B are secured to the read-head mounts 112A, 112B, and are configured to communicate corner cube or housing linear positions along the axis 101 with reference to respective encoder scales 116A, 116B.

Figure 1B:
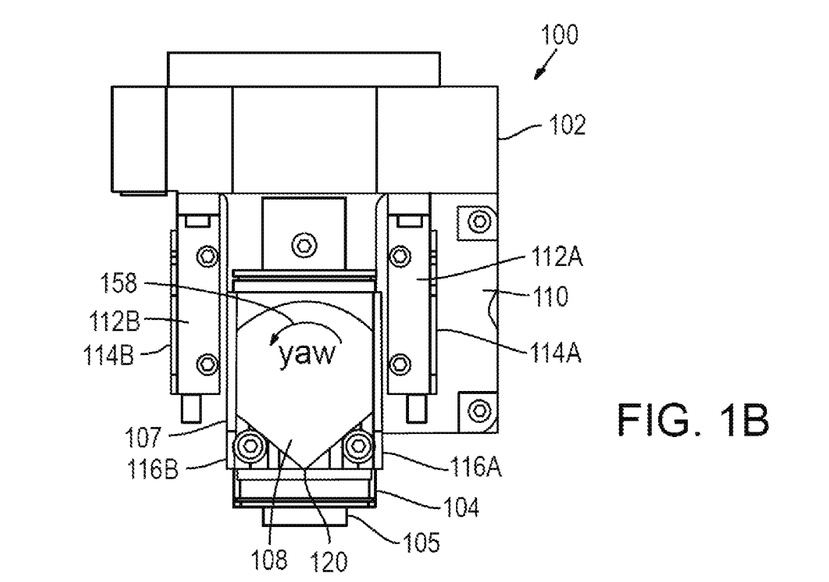
Figure 1C:
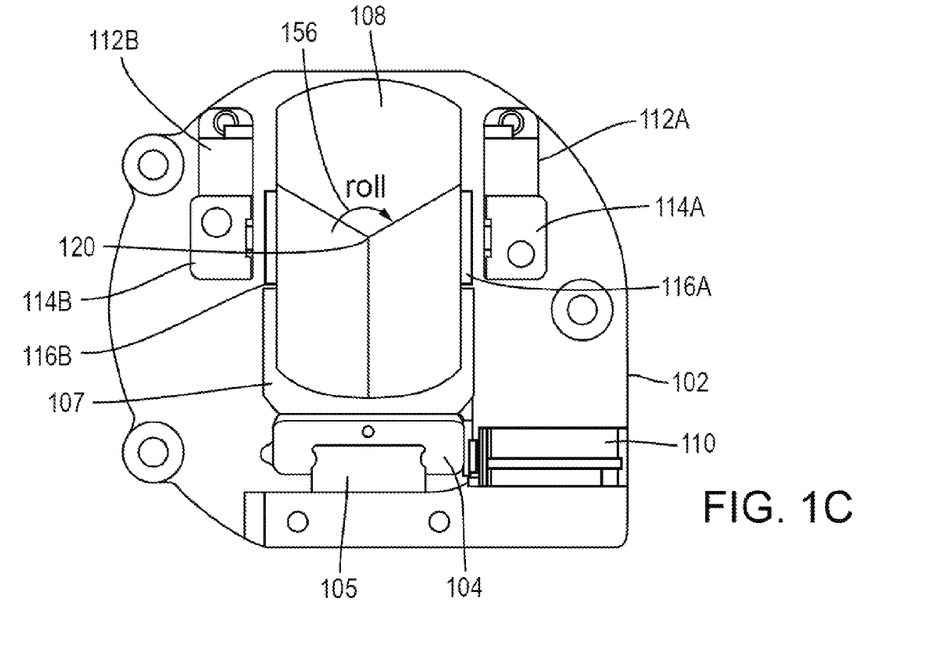
Figure 1D:
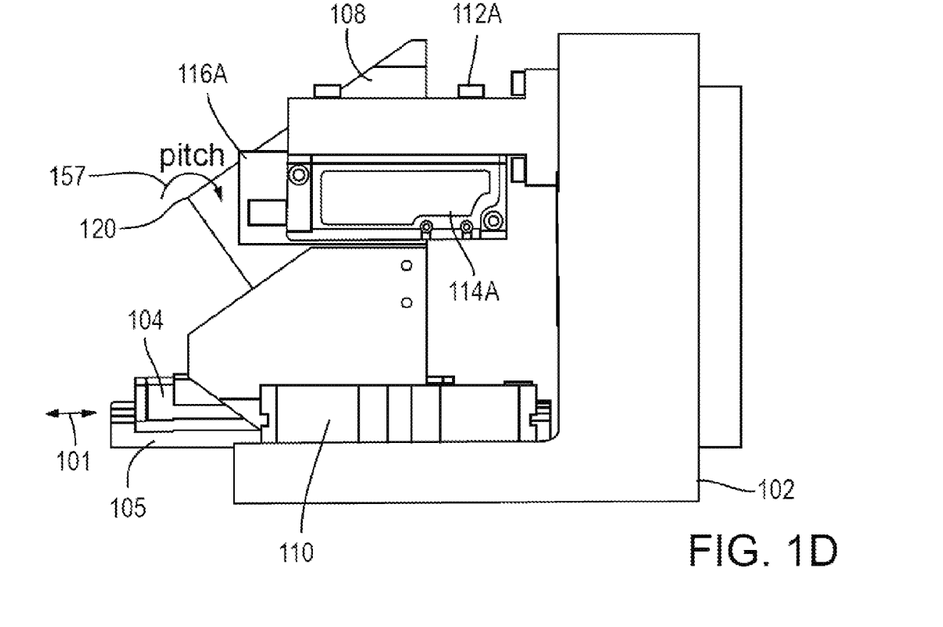

FIGS. 1B-1D provide rear, side, and top views of the focus stage 100 that illustrate roll, pitch, and yaw directions 156-158. A required preload force for the piezoelectric motor 110 is aligned with bearings of the linear guide 103 so that no roll moment is generated. Such a preload force can generate a yaw moment, causing the corner cube 108 to rotate in the yaw direction 158 as the corner cube 108 is moved along the rail 105. A single encoder would therefore report an erroneous distance, i.e., the distance of the movement along the rail 105 plus or minus a displacement due to yaw. Accordingly, as shown in FIGS. 1A-1D, encoders are placed on opposite sides of the corner cube 108 so that yaw errors can be reduced or eliminated. For example, a distance can be reported that is an average of the distances reported by read heads 114A, 114B. Pitch errors can arise from the acceleration of moving elements with respect to the rail 105. As shown in FIG. 1D, to minimize or reduce such pitch errors, the encoder read heads 114A, 114B and scales 116A, 116B are mounted in-line with the corner cube nodal point 120, which, in the example of FIGS. 1A-1D, is at a vertex of the corner cube 108. As a result, any pitch errors in the corner cube 108 result in displacements of the nodal point 120 that are effectively equal (within a small tolerance) to pitch error based distance contributions reported by the encoder read-heads 114A, 114B. Choosing a stiff linear guide minimizes or reduces the effects of roll, pitch and yaw errors.

The read-head mounts 112A, 112B and the encoder scales 116A, 116B can be formed of nickel/iron compositions such as Invar or other materials with very low coefficients of thermal expansion. With this construction, thermal expansion in the focus assembly 100 does not tend to introduce errors in encoder read-out. Changes in optical path length due to thermal expansion and changes in index of refraction of the corner cube 108 can be reduced or minimized by choosing a corner cube material having change in optical path length due to change in index of refraction with temperature that is opposite to its change in optical path length due to thermal expansion. Such a corner cube can be referred to as optically thermally invariant.

EXAMPLE 2

Actuated Spring Counterweight for Laser Radar Focusing

In certain laser radar arrangements, a corner cube used for focus adjustments must travel vertically and against gravity. In other arrangements, the corner cube must travel horizontally and its motion is not affected by gravity in the same manner. Maintaining a constant position with a voice coil motor while countering the effects of gravity generates significant heat. This can be reduced by offsetting the gravitational force with a counterweight. However, because some configurations are subject to gravity and others are not, common solutions such as a constant force spring are not suitable.

Figure 2A:
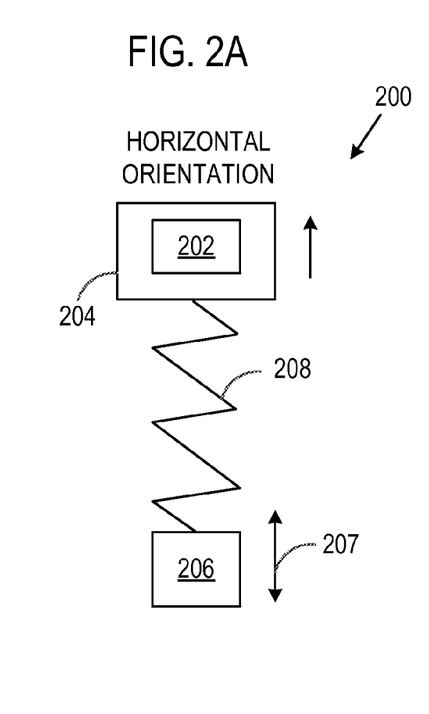
FIGS. 2A-2C illustrate a focus system that includes an optic actuator configured to adjust a focus element and a spring actuator configured to establish orientation-independent forces for adjustment of the focus element.
Figure 2B:
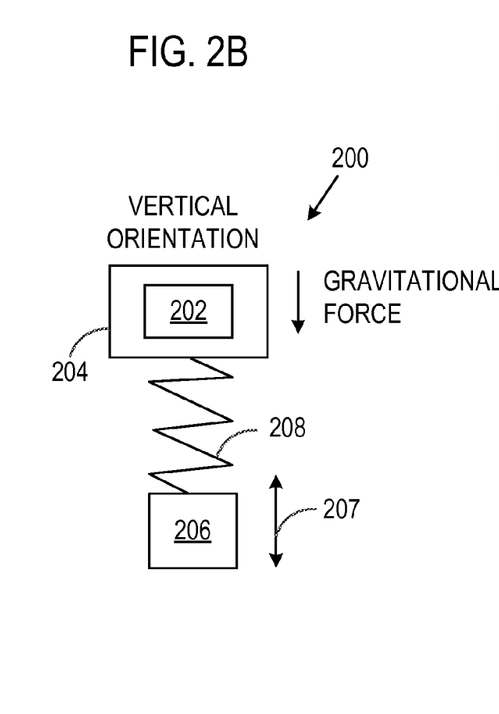
Figure 2C:
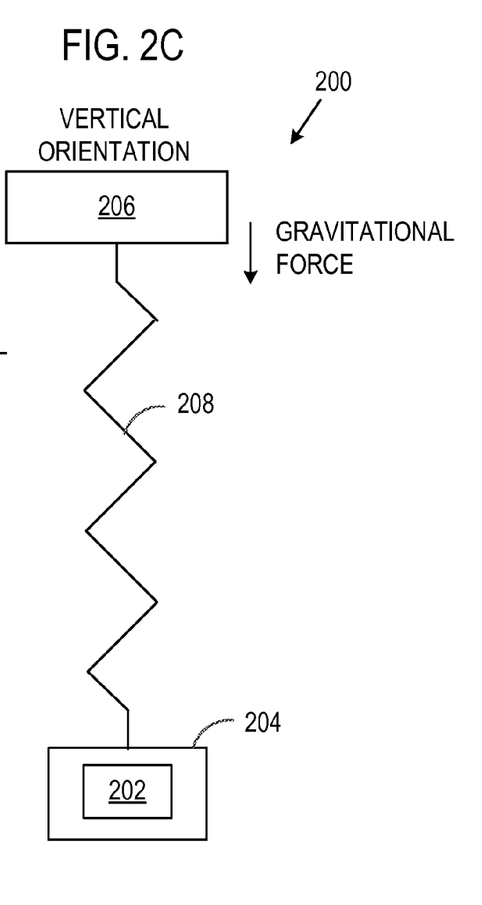

FIGS. 2A-2C illustrate a compensated actuator system 200. An optical assembly 202 is secured to an optic actuator 204. In one example, the optical assembly 202 is a focus adjustment optical element such as a corner cube for a laser radar system, but other optical assemblies (or non-optical assemblies) can be secured to the optic actuator 204. A compensating actuator 206 is coupled to the optic actuator 204 with a spring 208 or other component that can provide a compensating force to the optic actuator 204. The actuators 204, 206 are configured to move along an axis 207. As shown in FIG. 2A, in a horizontal orientation (i.e., without net gravitational forces), the compensating actuator 206 is positioned so that a force provided by the spring 208 to the optic actuator has a selected value. Typically, the compensating actuator 206 is adjusted so that the selected value is zero. With such an adjustment, the optic actuator 204 encounters a symmetric force from the spring 208 in moving the optical assembly 202.

Referring to FIG. 2B, the compensated actuator 200 is illustrated positioned vertically, with the compensating actuator 206 below the optic actuator 204. In this orientation, the compensating actuator 206 is configured to move upward so that the spring 208 is compressed so as to apply a force to the optic actuator 204 that counters gravitational forces on the optical assembly 202. Typically, the compensating actuator 206 is translated so that the spring 208 provides a force corresponding to a weight of the optical assembly 202. In this arrangement, motion of the optical assembly 202 is associated with the same (or substantially the same) symmetric spring force as in the horizontal orientation of FIG. 2A. Thus, this configuration provides an equal-force counterweight independent of gravitational forces, i.e., independent of the orientation of the optical assembly 202.

Referring to FIG. 2C, the compensated actuator 200 is illustrated positioned vertically, with the compensating actuator 206 above the optic actuator 204. In this orientation, the compensating actuator 206 is configured to move upward so that the spring 208 is extended so as to apply a force to the optic actuator 204 that counters gravitational forces on the optical assembly 202. Typically, the compensating actuator 206 is translated so that the spring 208 provides a force corresponding to a weight of the optical assembly 202. In this arrangement, motion of the optical assembly 202 is associated with the same (or substantially the same) symmetric spring force as in the horizontal orientation of FIG. 2A. Thus, this configuration provides an equal-force counterweight independent of gravitational forces, i.e., independent of the orientation of the optical assembly 202. However, in operation, additional force is required to overcome the spring stiffness. Thus additional force is orientation-independent. The magnitude of the additional force is dependent on spring stiffness. A stiff spring requires only a small displacement $\Delta x$ to counter gravitational force, as $\Delta x \sim 1/k$, wherein k is a spring constant. For a less stiff spring, the spring constant is smaller so that the necessary displacement $\Delta x$ is larger. In a particular application, a suitable k can be selected based on available displacement and the additional force required in operation.

FIGS. 2A-2C illustrate a particular example of a compensated actuator system. In this example, a spring is configured to provide suitable forces so that gravitational force changes associated with orientation changes are compensated. By adjusting a spring length with a compensating actuator based on an orientation of an optic actuator, net forces (spring plus gravitational forces) on an optical assembly can be made substantially the same for arbitrary orientations. However, springs are not required, and such compensation forces can be applied in other ways such as with elastic materials. Only vertical and horizontal alignments are shown, but the compensating actuator 206 can extend or compress the spring 208 appropriately in any orientation.

Figure 3A:
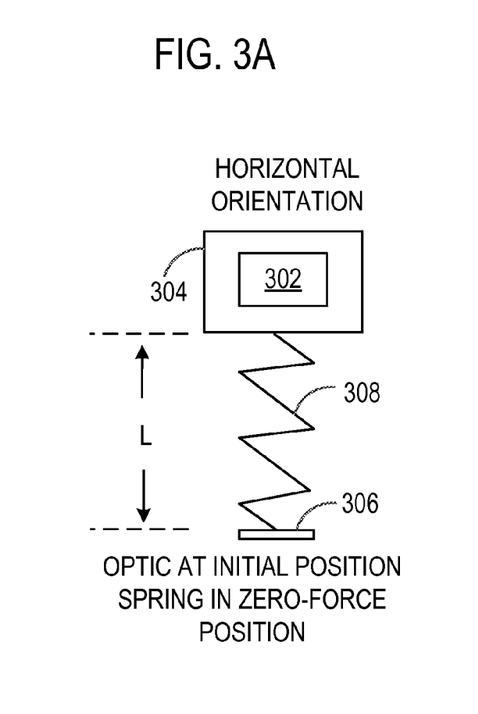
FIGS. 3A-3C illustrate operation of an uncompensated focus system.
Figure 3B:
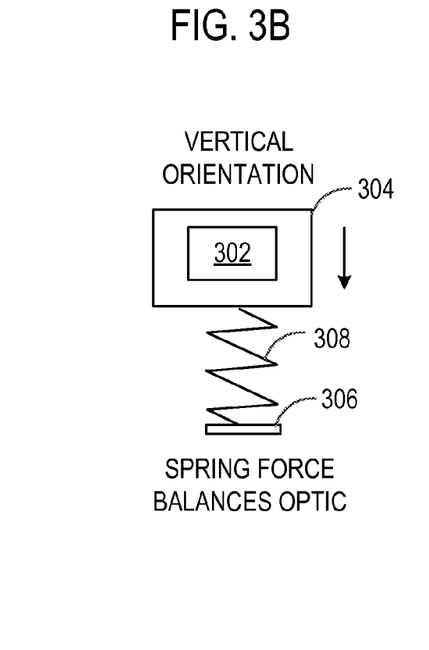
Figure 3C:
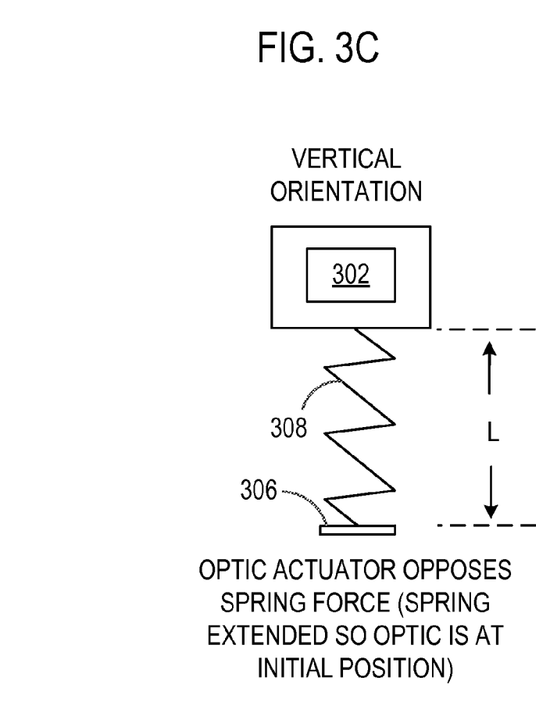

FIGS. 3A-3C illustrate an uncompensated optic actuator 304 that is configured to translate an optical assembly 302. FIG. 3A illustrates the optic actuator 302 coupled to a spring 308 that is secured to a fixed termination 306 so that the net spring force is zero. FIG. 3B shows the optic actuator 304 when aligned vertically above the fixed termination 306, showing that the spring 308 is compressed due to gravitational forces on the optical assembly 302. In FIG. 3C, the optical assembly 302 arranged as in FIG. 3B is returned to its original position so as to extend the spring 306 to the length of FIG. 3A. However, in this arrangement, at the initial optical assembly position, the optic actuator experiences a gravitational force when moving the optical assembly 302, and gravitational forces are neither cancelled nor compensated.

Figure 4:
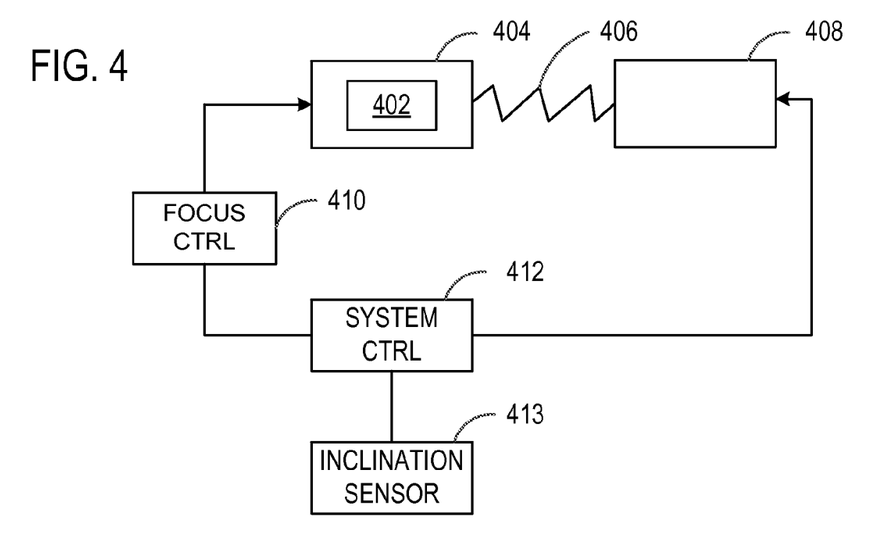
FIG. 4 is a block diagram of a focus system that includes an inclination sensor.

With reference to FIG. 4, a representative optical system comprises an optical assembly 402 that is translatable with a linear actuator 404. A compensating actuator 408 is coupled to the linear actuator 404 with an elastic member 406. Typically, a position of the compensating actuator 408 is set so that in a horizontal alignment, the elastic member 406 applies no or minimal force to the optical assembly 402. Non-zero force bias positions can be selected as well, if preferred. An inclination sensor 413 is coupled to a controller 412 that can then direct the compensating actuator 408 to translate based on an inclination of the optical assembly 402 so that a zero net force condition is maintained. In a laser radar, beam scanning is performed with an elevational rotation stage and an azimuthal rotational stage. Stage rotations are typically controlled or sensor with corresponding stage encoders. One or both of these stage encoders can serve as an inclination sensor. A focus controller 410 can then adjust the optical assembly 402 from a zero force position, regardless of orientation. The required movement of the compensating actuator can be based on a force provided by the elastic member ($F_k$=kx, wherein k is an elastic constant and x is a displacement) and the gravitational force on the optical assembly ($F_g$=mg sin θ, wherein m is mass to be moved, g is a gravitational constant, and θ is an elevational angle associated with a direction of movement). Based on the elastic constant, the compensating actuator 408 is moved a distance mg sin θ/k in the appropriate direction so as to restore zero initial net force.

Figure 5:
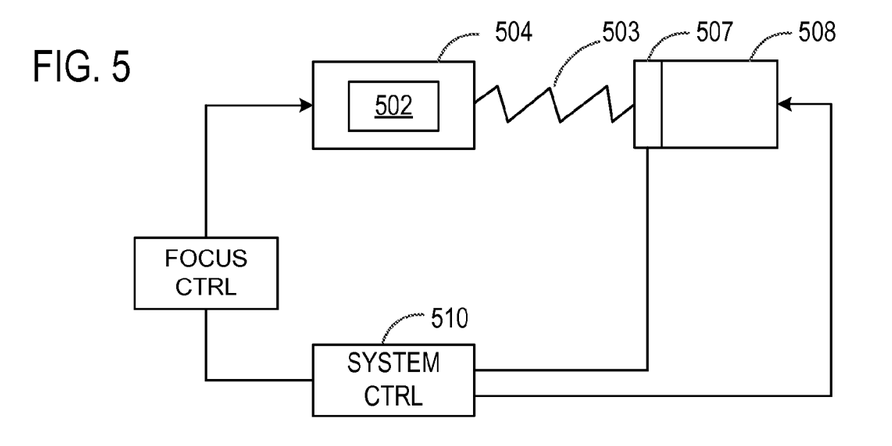
FIG. 5 is a block diagram of a focus system that includes a force sensor.

With reference to FIG. 5, another representative optical system comprises an optical assembly 502 that is translatable with a linear actuator 504. A compensating actuator 508 is coupled to the linear actuator 504 with an elastic member 503. A force sensor 507 is situated between the compensating actuator 508 and the elastic member 503 (or between the linear actuator 504 and the elastic member 503). Based on a detected force, the compensating actuator is displaced to return the optical assembly 502 to an initial position so that the force sensor reports a force corresponding to a weight. In other examples, a force output from a system controller 510 can be used instead of a separate force sensor. Measurement of inclination is not used. In other alternatives, an initial position is identified with a position sensor, and the compensating actuator 508 is moved so as to return the optical assembly to an initial position as determined with one or more linear encoders such as shown in FIGS. 1A-1D discussed above.

EXAMPLE 3

Example Compensating Methods

Figure 6:
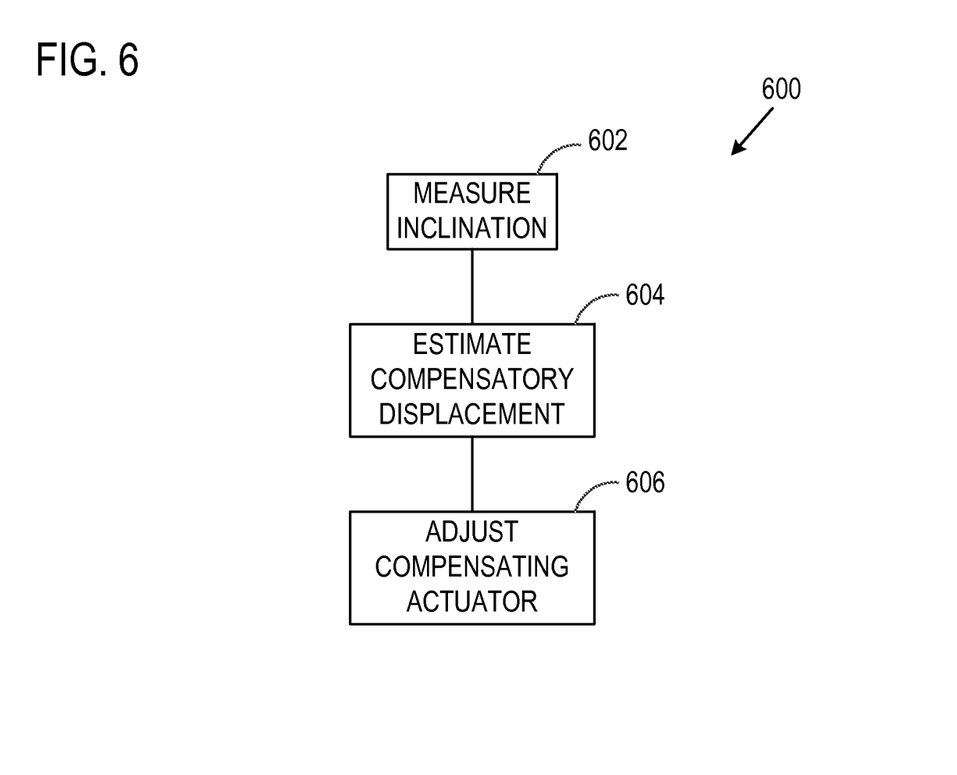
FIG. 6 is a block diagram of a representative method of compensating gravitational forces in moving an optical system.

A representative method 600 is illustrated in FIG. 6. At 602, an inclination is measured and at 604 a suitable compensatory displacement is estimated. At 606, a compensating actuator is moved based on the estimated displacement. Alternatively, an initial position can be determined, and a compensating actuator used to reestablish the initial position.

EXAMPLE 4

Laser Radar with Corner Cube Focus Adjustment

Figure 7:
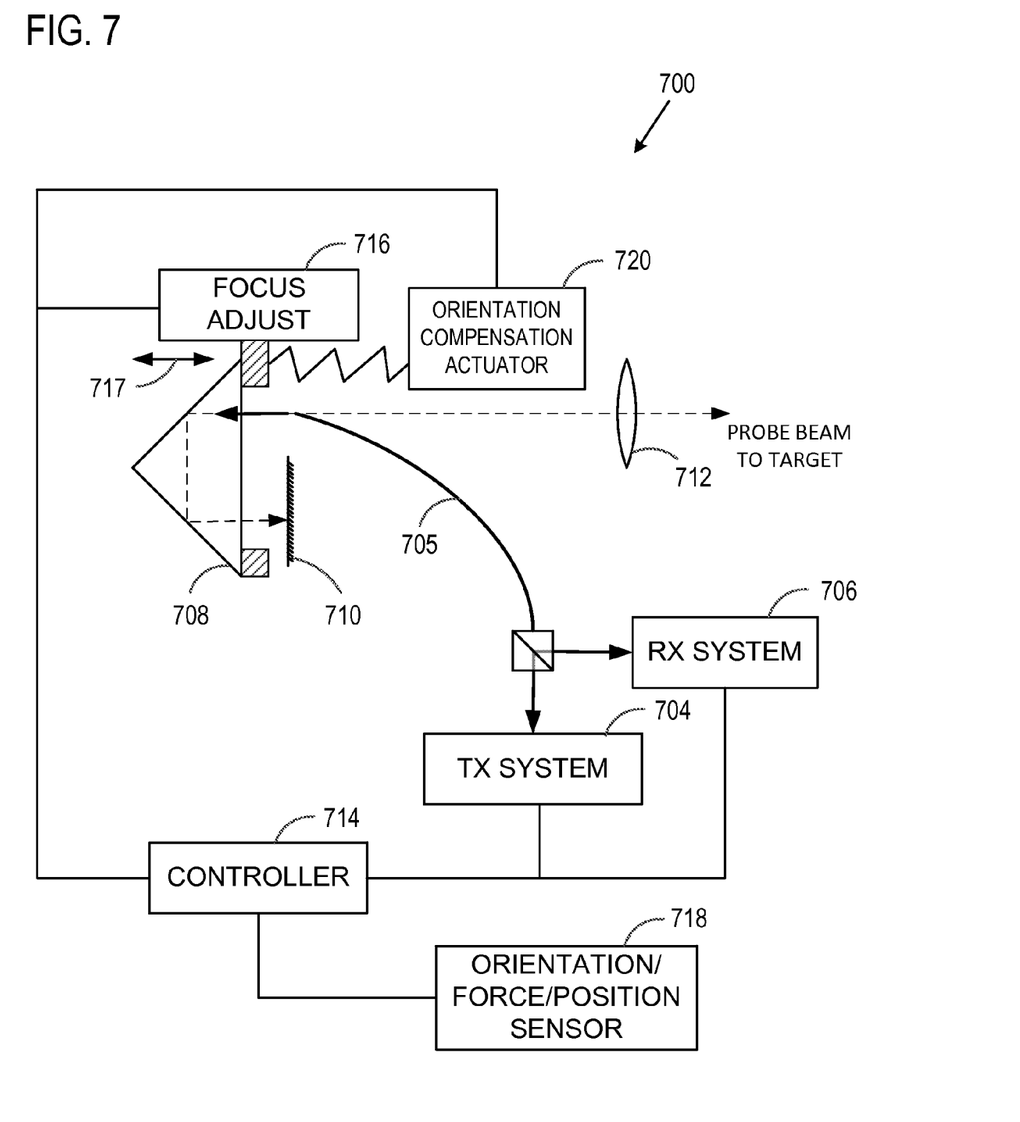
FIG. 7 is a block diagram of a laser radar system that includes a compensated focus adjustment mechanism for moving a corner cube.

A representative laser radar system 700 is illustrated in FIG. 7. A receiver system 704 and a transmitter system 706 are optically coupled to an optical fiber 705 so as to deliver an optical beam to a target and to receive reflected, scattered, or other returned beam portions. A corner cube 708 is situated to receive an input beam from the optical fiber 705, direct the input beam to a return reflector 710, and then direct the beam received back from the return reflector 710 to a focusing lens 712 so that a probe beam is focused at a target. Portions of the probe beam from the target follow this path in reverse back to the optical fiber 705 and then to the receiver system 706.

A focus adjust stage 716 is configured to move the corner cube along a focus axis 717. The focus adjust stage 716 can include a compensating actuator 720 as described above. A system controller 714 is configured to select probe beam scan angles and can determine a direction in which the measurement beam is to be directed to the target. If desired, the direction of the focus axis 717 can be used to adjust the compensating actuator. Alternatively, an orientation sensor 718 can be configured to provide orientation information to the controller 714 which can then determine and communicate a suitable adjustment of the compensating actuator. In some examples, an orientation of a fixed laser radar base is provided with the orientation sensor 718, and adjustments of the compensating actuator 720 are not needed in response to beam scan angles. As noted above, suitable adjustments can be predetermined based on orientation, or to return to an initial position, or based on a measured gravitational or other force.

EXAMPLE 5

Manufacturing Apparatus and Methods

Figure 8:
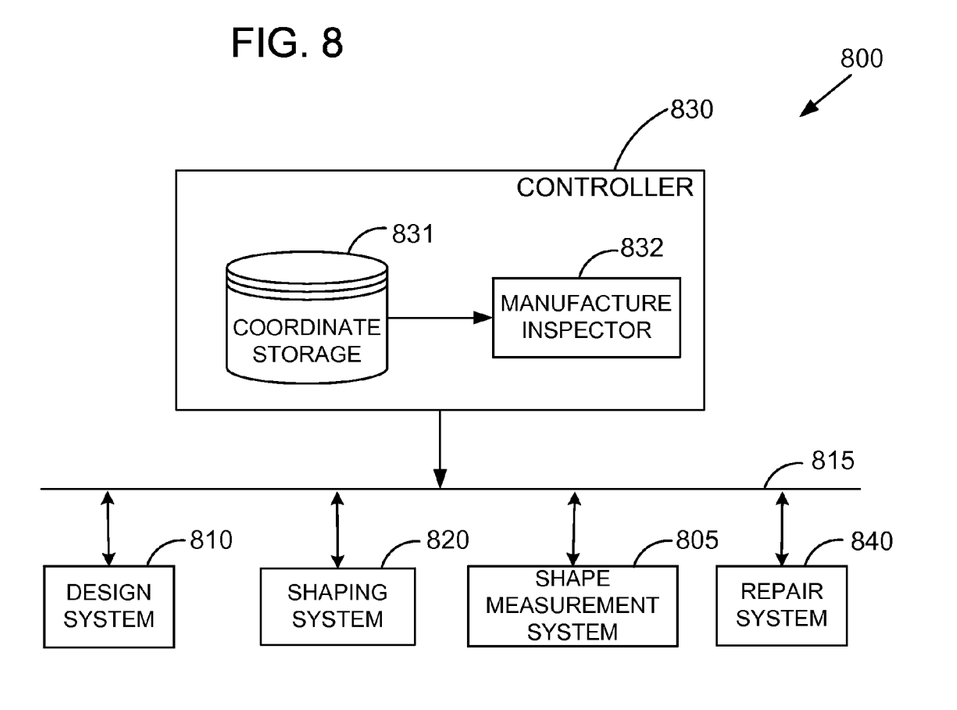
FIG. 8 is a block diagram of a representative manufacturing system that includes a laser radar or other profile measurement system to manufacture components, and assess whether manufactured parts are defective or acceptable.

Manufacturing methods and apparatus can include any of the examples disclosed above. FIG. 8 illustrates a representative manufacturing system 800 suitable for producing one or more components of a ship, airplane, or part of other systems or apparatus, and for evaluating and reprocessing such manufactured components. The system 800 typically includes a shape or profile measurement system 805 such as the laser radar discussed above. The manufacturing system 800 also includes a design system 810, a shaping system 820, a controller 830, and a repair system 840. The controller 830 includes coordinate storage 831 configured to store measured and design coordinates or other characteristics of one or more manufactured structures as designed and/or measured. The coordinate storage 831 is generally a computer readable medium such as hard disk, random access memory, or other memory device. Typically, the design system 810, the shaping system 820, the shape measurement system 805, and a repair system 840 communicate via a communication bus 815 using a network protocol.

The design system 810 is configured to create design information corresponding to shape, coordinates, dimensions, or other features of a structure to be manufactured, and to communicate the created design information to the shaping system 820. In addition, the design system 810 can communicate design information to the coordinate storage 831 of the controller 830 for storage. Design information typically includes information indicating the coordinates of some or all features of a structure to be produced.

The shaping system 820 is configured to produce a structure based on the design information provided by the design system 810. The shaping processes provided by the shaping system 820 can include casting, forging, cutting, or other process. The shape measurement system 805 is configured to measure the coordinates of one or more features of the manufactured structure and communicate the information indicating measured coordinates or other information related to structure shape to the controller 830.

A manufacture inspector 832 of the controller 830 is configured to obtain design information from the coordinate storage 831, and compare information such as coordinates or other shape information received from a profile measuring apparatus such as the apparatus discussed above with design information read out from the coordinate storage 831. The manufacture inspector 832 is generally provided as a processor and a series of computer-executable instructions that are stored in a tangible computer readable medium such as random access memory, a flash drive, a hard disk, or other physical devices. Based on the comparison of design and actual structure data, the manufacture inspector 832 can determine whether or not the manufacture structure is shaped in accordance with the design information, generally based on one or more design tolerances that can also be stored in the coordinate storage 831. In other words, the manufacture inspector 832 can determine whether or not the manufactured structure is defective or nondefective. When the structure is not shaped in accordance with the design information (and is defective), then the manufacture inspector 832 determines whether or not the structure is repairable. If repairable, then the manufacture inspector 832 can identify defective portions of the manufactured structure, and provide suitable coordinates or other repair data. The manufacture inspector 832 is configured to produce one or more repair instructions or repair data and forward repair instructions and repair data to the repair system 840. Such repair data can include locations requiring repair, the extent of re-shaping required, or other repair data. The repair system 840 is configured to process defective portions of the manufactured structure based on the repair data.

Figure 9:
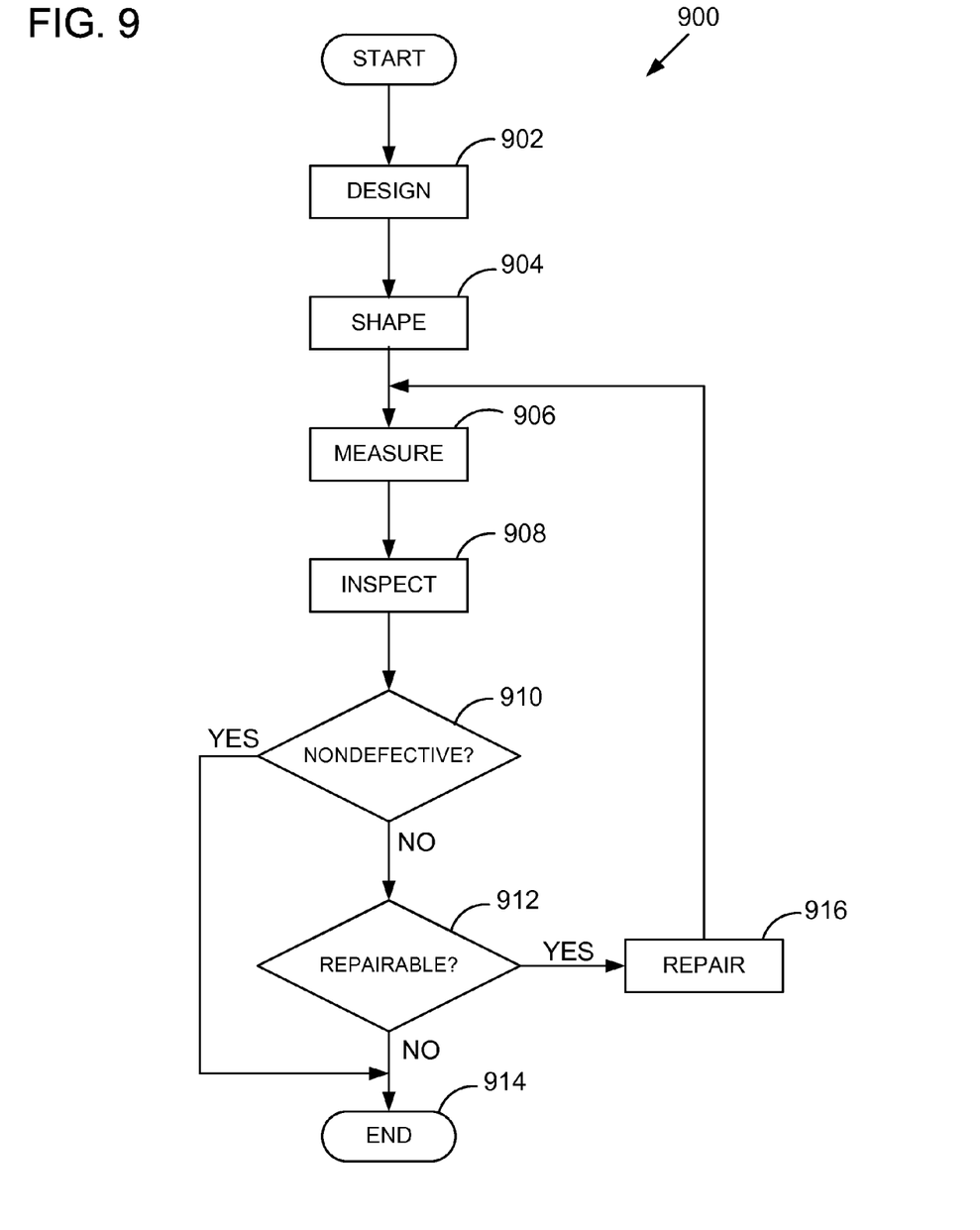
FIG. 9 is a block diagram illustrating a representative manufacturing method that includes profile measurement to determine whether manufactured structures or components are acceptable, and if one or more such manufactured structures can be repaired.

FIG. 9 is a flowchart showing a representative manufacture method 900 that can incorporate manufacturing systems such as illustrated in FIG. 8. At 902, design information is obtained or created corresponding to a shape of a structure to be manufactured. At 904, the structure is manufactured or "shaped" based on the design information. At 906, coordinates, dimensions, or other features of the manufactured structure are measured with a profile measurement system such as the laser radar systems described above to obtain shape information corresponding to the structure as manufactured. Typically, profile measurement is accomplished with a fine scan and a coarse scan of a laser beam. At 908, the manufactured structure is inspected based on a comparison of actual and design dimensions, coordinates, manufacturing tolerance, or other structure parameters. At 910, if the manufactured structure is determined to be nondefective, the manufactured part is accepted and processing ends at 914. If the manufactured part is determined to be defective at 910 by, for example, the manufacture inspector 832 of the controller 830 as shown in FIG. 8, then at 912 it can be determined whether the manufacture part is repairable. If repairable, the manufactured part is reprocess or repaired at 916, and then measured, inspected, and reevaluated at 906, 908, 910, respectively. If the manufactured part is determined to be unrepairable at 912, the process ends at 914.

According to the method of FIG. 9, using a profile measurement system to accurately measure or assess coordinates or other features of a manufactured structure, a manufactured structure can be evaluated to determine if the structure is defective or nondefective. Further, if a manufactured structure is determined to be defective, a reprocessing process can be initiated if the part is deemed to be repairable based on design and actual structure dimensions and features. By repeating the measurement, inspection, and evaluation processes, defective parts can be reprocessed, and parts that are defective but that are not repairable can be discarded. The particular systems and methods of FIGS. 8-9 are exemplary only, and other arrangements can be used.

In the above embodiment, the structure manufacturing system 900 can include a profile measuring system such as the laser radar and laser tracking systems disclosed above, the design system 810, the shaping system 820, the controller 830 that is configured to determine whether or not a part is acceptable (inspection apparatus), and the repair system 840. However, other systems and methods can be used and the examples of FIGS. 8-9 are provided for convenient illustration.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A focus stage, comprising:
a linear stage that includes a carriage and a guide;
a motor configured to translate the carriage along an axis defined by the guide;
first and second linear encoders oppositely situated along the axis and configured to provide an indication of carriage position based on combination of encoder signals from the first and second linear encoders; and
a focus adjustment optical element secured to the carriage, wherein the focus adjustment optical element is situated to direct a measurement beam from a light source to a target, the focus adjustment optical element coupled to a distance measurement device that provides an estimated target distance for at least one target location based on a return beam from the target.

2. The focus stage of claim 1, wherein the motor is a piezoelectric motor.

3. The focus stage of claim 1, wherein the focus adjustment optical element is secured to the carriage so as to have a nodal point equidistant from the first and second linear encoders.

4. The focus stage of claim 3, wherein the first and second encoders include respective read heads and linear scales situated in line with the nodal point.

5. The focus stage of claim 1, wherein the focus adjustment optical element is a corner cube.

6. The focus stage of claim 1, further comprising a retro-reflector secured to the carriage and having a nodal point equidistant from the first and second linear encoders.

7. The focus stage of claim 1, wherein the focus adjustment optical element is situated to receive the return beam from the target.

8. A focus system, comprising:
a linear stage that includes a carriage and a guide;
a motor configured to translate the carriage along an axis defined by the guide;
first and second linear encoders oppositely situated along the axis and configured to provide an indication of carriage position based on combination of encoder signals from the first and second linear encoders;
a focus adjustment optical element secured to the carriage, wherein the focus adjustment optical element is situated to direct a measurement beam from a light source to a target, the focus adjustment optical element coupled to a distance measurement device that provides an estimated target distance for at least one target location based on a return beam from the target; and an actuator and an elastic member coupled to the focus adjustment optical element so as to compensate orientation-dependent forces.

9. The focus system of claim 8, wherein the actuator is configured to apply a force to the focus adjustment optical element so as to compensate an orientation-dependent gravitational force.

10. The focus system of claim 8, wherein the actuator is coupled to apply a compensating force to the focus adjustment optical element based on a position of the focus adjustment optical element reported by the first and second linear encoders.

11. The focus system of claim 10, wherein the elastic member is a spring.

12. The focus system of claim 8, wherein the focus adjustment optical element is a corner cube or a roof prism.

13. The focus system of claim 8, wherein the focus adjustment optical element is situated to receive the return beam from the target.

14. A measurement device, comprising:

a linear stage that includes a carriage and a guide;

a motor configured to translate the carriage along an axis defined by the guide;

first and second linear encoders oppositely situated along the axis and configured to provide an indication of carriage position based on a combination of encoder signals from the first and second linear encoders;

a focus adjustment optical element configured to produce a measurement beam from a light source and to receive a return beam from a target; and a signal processor configured to provide an estimated target distance for at least one target location based on the return beam.

15. A method for manufacturing a structure, comprising:

producing the structure based on design information;

obtaining shape information of the structure using the measurement device of claim 14; and comparing the obtained shape information with the design information.

* * * * *